United States Patent [19]

Susumu

[11] Patent Number: 4,982,582
[45] Date of Patent: * Jan. 8, 1991

[54] TEMPERATURE CONTROL DEVICE FOR A REFRIGERATING CONTAINER

[75] Inventor: Ikeda Susumu, Gunma, Japan

[73] Assignee: Sanden Corporation, Isesaki, Japan

[*] Notice: The portion of the term of this patent subsequent to May 9, 2006 has been disclaimed.

[21] Appl. No.: 245,626

[22] Filed: Sep. 19, 1988

Related U.S. Application Data

[63] Continuation-in-part of Ser. No. 61,474, Jun. 15, 1987, Pat. No. 4,827,731.

[30] Foreign Application Priority Data

Jun. 14, 1986 [JP] Japan .................................. 61-90020
Jun. 14, 1986 [JP] Japan .................................. 61-90023

[51] Int. Cl.⁵ ............................................ F25D 29/00
[52] U.S. Cl. ...................................... 62/115; 62/161; 200/46; 200/61.81
[58] Field of Search ............... 200/61.58 R, 46, 61.81; 62/161, 115; 236/78 R; 364/557

[56] References Cited

U.S. PATENT DOCUMENTS 4,399,428  8/1983  Hughes et al. ..................... 340/500
4,646,529  3/1987  Hanson ................................. 62/155
4,738,117  4/1988  Takasugi ............................... 62/200
4,827,731  5/1989  Ikeda ..................................... 62/161

FOREIGN PATENT DOCUMENTS 58-182721A 10/1983 Japan .

Primary Examiner—William E. Wayner
Attorney, Agent, or Firm—Banner, Birch, McKie & Beckett

[57] ABSTRACT

There is provided a temperature control device for a refrigerated container having a plurality of temperature level determining switches for selecting a temperature level. Cut-out portions are provided on the refrigerated container for selectively controlling the temperature level determining switches. A selected temperature level is determined by the selective removal of the cut-out portions from the refrigerated container. A logic circuit coupled to the switches outputs a signal indicative of the selected temperature level. A voltage generating circuit generates a voltage corresponding to the selected temperature level. A comparator compares the selected temperature level with the actual temperature detected by a thermal element in the refrigerated container. A control element controls the operation of the refrigerating apparatus in accordance with an output signal from the comparator.

4 Claims, 3 Drawing Sheets

TEMPERATURE CONTROL DEVICE FOR A REFRIGERATING CONTAINER

This application is a continuation-in-part application of application Ser. No. 07/061,474, filed Jun. 15, 1987, now U.S. Pat. No. 4,827,731.

BACKGROUND OF THE INVENTION

This invention generally relates to temperature control devices, and more particularly, to a temperature control device for refrigerated, transferable containers or boxes.

Generally, when refrigerated merchandise is transported, vehicles provided, with a refrigerating container or chamber are used. The interior of the refrigerated container is normally divided into several compartments which correspond to different types of refrigerated merchandise which should be stored under different temperature conditions. However, in some instances the containers are used to transport merchandise which may be stored at the same temperature. Therefore, some of the refrigerating space of the container is not utilized which results in inefficient use of the refrigerating space.

Furthermore, if the same container is used to transport both refrigerated merchandise and general freight, there are limitations on the types of refrigerated merchandise that may be transported in the same container.

To overcome the above disadvantages, a refrigerating apparatus which is able to refrigerate a plurality of small transportable containers under different temperature conditions is shown in Japanese Patent Application No. 137283/61. However, in the refrigerating apparatus described in the aforesaid application, the setting and determination of the temperature at which each container or box is to be maintained is complicated.

SUMMARY OF THE INVENTION

It is a primary object of this invention to provide a temperature control device in which the temperature within each of a plurality of refrigerated containers or boxes may be easily determined.

It is another object of this invention to provide a temperature control device which has a simple construction.

According to the present invention, there is provided a temperature control device for a refrigerated container having a plurality of temperature level determining switches for selecting a temperature level. Cut-out portions are provided on the refrigerated container for selectively controlling the temperature level determining switches. A selected temperature level is determined by the selective removal of the cut-out portions from the refrigerated container. A logic circuit coupled to the switches outputs a signal indicative of the selected temperature level. A voltage generating circuit generates a voltage corresponding to the selected temperature level. A comparator compares the selected temperature level with the actual temperature detected by a thermal element in the refrigerated container. A control element controls the operation of the refrigerating apparatus in accordance with an output signal from the comparator.

BRIEF DESCRIPTION OF THE DRAWINGS

A more complete appreciation of the present invention and many of the attendant advantges thereof will be readily obtained as the invention becomes better understood from the following detailed description with reference to the attached drawings.

DETAILED DESCRIPTION OF PREFERRED EMBODIMENT

Figure 1:
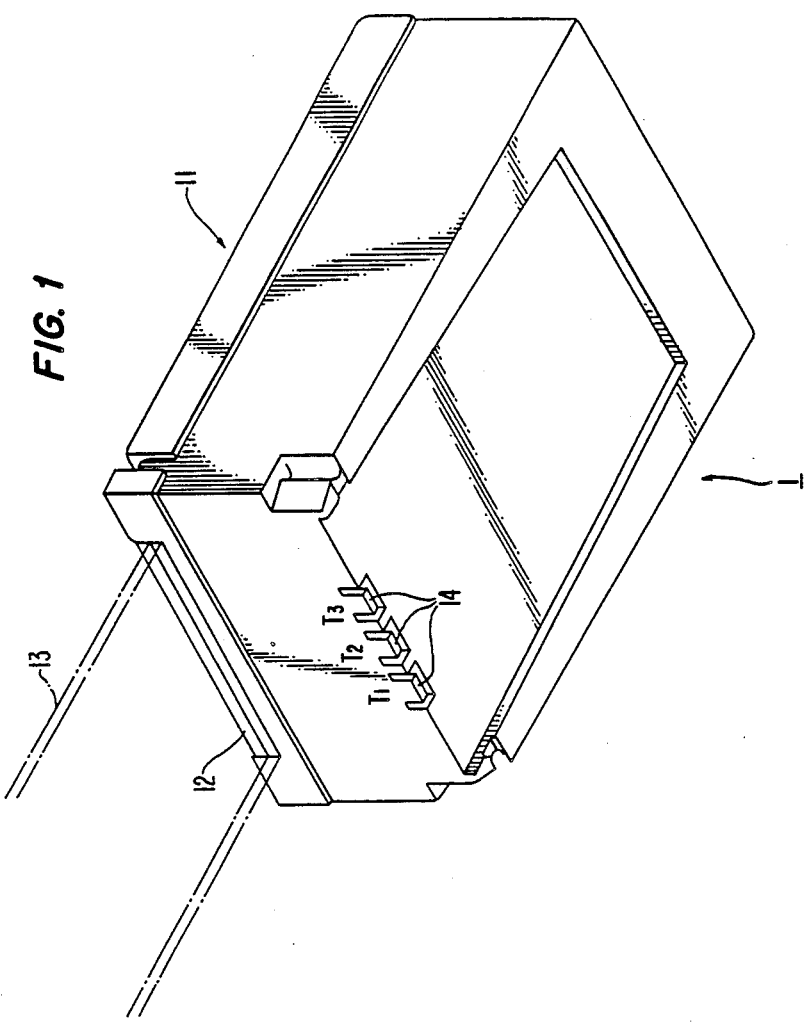
FIG. 1 is a perspective view of a container or box illustrating some features of the controllable temperature level determining device in accordance with the present invention.

FIG. 1 shows a container or box, generally indicated as 1, the interior of which should be maintained at or under a predetermined temperature. Container 1 includes a substantially rectangular-shaped, insulated box, generally indicated as 11, with an upper opening and cover plate 12, which covers the upper opening of box 11. The interior of container 1 is refrigerated by an evaporator apparatus denoted by dashed lines 13 which extends into the interior of insulated box 11, thereby controlling the temperature in the interior of container 1. In a conventional refrigeration system, apparatus 13 may be an evaporator.

A plurality of cut-out portions 14 are formed on a lower edge portion of container 1. Cut-out portions 14 function to control corresponding temperature level determining switches. Each cut-out portion 14 includes a contact surface for the switches. Thus, when a cut-out portion contacts the corresponding temperature level determining switch, that switch is closed. If a cut-out portion does not contact the corresponding switch, the switch is open.

Figure 2:
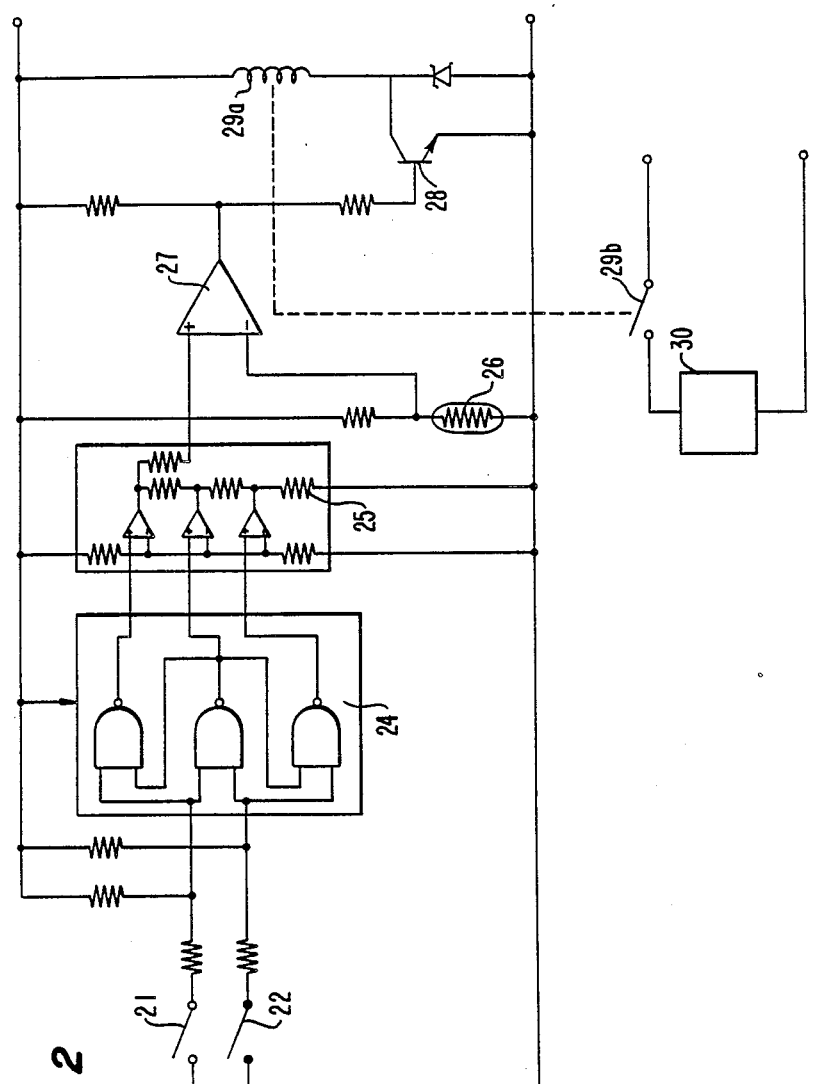
FIG. 2 is a schematic circuit diagram of the temperature control device in accordance with one embodiment of the present invention.

As shown in FIG. 2, the temperature control device of the present invention includes at least two temperature determining switches 21, 22 which are coupled in parallel with each other and which correspond to cut-out portions 14 of container 1. Switches 21, 22 are each connected with logic circuit 24 (which operates in a conventional manner). Logic circuit 24 outputs temperature level determining signals in accordance with input signals from switches 21, 22.

In a preferred embodiment, two switches are used. Therefore, four signals may be output from logic circuit 24. These output signals represent predetermined temperature level signals, each signal indicating a different temperature level. The output signals from logic circuit 24 are applied to voltage generating circuit 25. Voltage generating circuit 25 generates a predetermined voltage corresponding to the temperature level, in a known manner, in accordance with the output signal from logic circuit 24.

The predetermined voltage output from voltage generating circuit 25 is applied to the non-inverting input terminal (+) of comparator 27 so as to be compared with a variable voltage which represents the actual temperature in container 1. The variable voltage representing the actual temperature is generated by thermistor 26 which is disposed in the interior of container 1. The resistance of thermistor 26 varies in accordance with temperature changes. The output signal of comparator 27 controls the energization of transistor 28. Depending on the energization of transistor 28, relay coil 29a of a relay controls the operation of contact point terminal 29b of the relay to control the control device 30 of the refrigerating apparatus. Control device 30 may be a compressor for a refrigerating apparatus.

Figure 3:
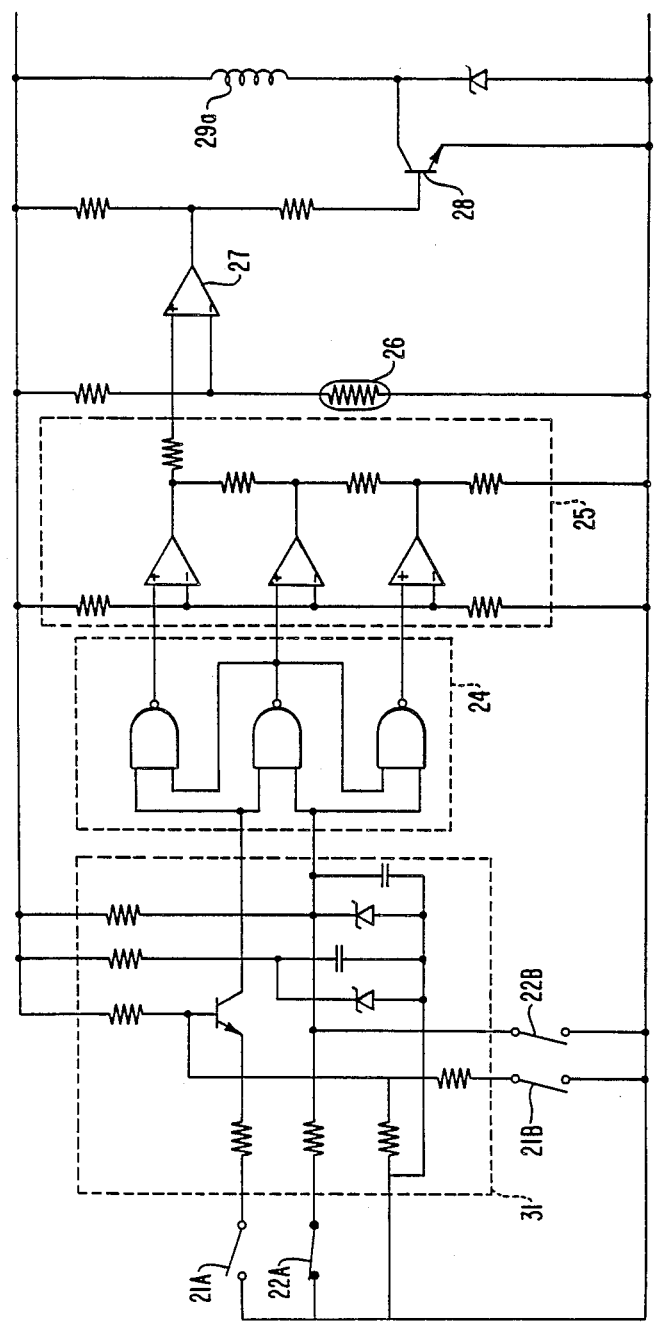
FIG. 3 is a schematic circuit diagram of the circuit of FIG. 2 with a modification in accordance with another embodiment of the present invention.

The circuits of FIGS. 2 and 3 also show various resistors and diodes which are used in the control circuitry in a known manner. A description of these elements is not included here since such is considered unnecessary for one of ordinary skill in the art to understand the invention.

The predetermined temperature level in each container 1 is determined by the open and close state of temperature determining switches 21, 22. If one of cut-out portions 14 does not contact the corresponding switch, that switch, e.g., 21, is open. On the other hand if a cut-out portion 14 does contact the corresponding switch, that switch, e.g., 22 is closed. Thus, the state of the switches depends on contact with a cut-out portion 14. Therefore, in this embodiment, four different temperature levels can be selected.

The respective switches are closed by contact with the corresponding cut-out portion. Thus, according to a preferred embodiment, if one of the cut-out portions is removed from the container, the corresponding switch remains open. As noted, the temperature level in each container is determined by the states of the switches. By simply selectively removing the cut-out portions, the temperature may be accurately set for each container. This may be done quickly and without complicated controls and circuitry.

As a result of the input signals due to the open and close state of switches 21, 22, logic circuit 24 outputs temperature level determining signals. The actual temperature condition in the interior space of container 1 is then compared with the predetermined temperature level, and as a result of the comparison, the refrigeration of the container by refrigerating evaporator apparatus 13 is controlled so as to maintain the actual temperature under the predetermined level.

In a preferred embodiment, container 1 may be pre-cooled before storing merchandise to prevent the exposure of the merchandise to drastic temperature changes. In this situation, the temperature is maintained at a temperature slightly higher than the normal refrigerating temperature. Therefore, as shown in FIG. 3, the temperature control device is provided with sub-switches 21b, 22b for determining a pre-cooling temperature level, and the operation of main switches 21a, 22a and sub-switches 21b, 22b is controlled by switching circuit 31 in a known manner. In this manner, the temperature within the container can be effectively maintained without wasting energy.

This invention has been described in detail in connection with the preferred embodiments. These embodiments, however, are merely for example only and the present invention is not restricted thereto. It will be understood by those skilled in the art that other variations and modifications can be easily made within the scope of this invention as defined in the appended claims.

I claim:

1. A temperature control device for controlling the temperature of refrigerated container which is cooled by a refrigerating apparatus, said temperature control device comprising:
   a plurality of temperature level determining switches for selecting a temperature level:
   selectively removable cutout portions provided on said refrigerating container for selectively controlling said temperature level determining switches, a selected temperature level being determined by the selective removal from said refrigerated container of said cutout portions;
   logic means connected to said switches for outputting a signal indicative of said selected temperature level;
   voltage generating means for generating a voltage corresponding to said selected temperature level in accordance with the output of said logic means;
   comparative means for comparing said selected temperature level with the actual temperature in said container; and
   control means for controlling said refrigerating apparatus in accordance with the output of said comparator means.

2. The temperature control device as claimed in claim 1 further comprising precooling switches associated with said temperature level determining switches for selectively precooling said container to a predetermined level.

3. The temperature control device as claimed in claim 1 further comprising temperature determining means for determining the actual temperature in said container, said temperature determining means comprising a temperature variable resistor.

4. A method for controlling the temperature of a refrigerator container which is cooled by a refrigerating apparatus, said method comprising steps of:
   providing a plurality of temperature level determining switches;
   manipulating said switches by the selective removal of cutout portions formed on said refrigerated container to select a desired temperature level;
   generating a voltage corresponding to said selected temperature level;
   determining the actual temperature in said container;
   comparing said actual temperature with said selected temperature level; and
   controlling said refrigerating apparatus in accordance with the results of the comparison of said actual temperature and said selected temperature level.

* * * * *

UNITED STATES PATENT AND TRADEMARK OFFICE
CERTIFICATE OF CORRECTION

PATENT NO. : 4,982,582
DATED : January 8, 1991
INVENTOR(S) : Susumu Ikeda It is certified that error appears in the above-identified patent and that said Letters Patent is hereby corrected as shown below:

On the title page, Section [19], delete "Susumu" and insert --Ikeda--;

On the title page, Section [75], Inventor: delete in its entirety and insert --Susumu Ikeda, Gunma, Japan--.

Signed and Sealed this

Twelfth Day of May, 1992

Attest:

DOUGLAS B. COMER

*Attesting Officer*    *Acting Commissioner of Patents and Trademarks*